United States Patent [19]

Arita et al.

[11] Patent Number: 4,902,760

[45] Date of Patent: Feb. 20, 1990

[54] CROSS-LINKED RESINS

[75] Inventors: Kazuhiro Arita, Takatsuki; Yasuo Sano, Minoo, both of Japan

[73] Assignee: Takeda Chemical Industries, Ltd., Osaka, Japan

[21] Appl. No.: 262,872

[22] Filed: Oct. 26, 1988

[30] Foreign Application Priority Data

Oct. 26, 1987 [JP] Japan .................................. 62-271316

[51] Int. Cl.$^4$ ............................................. C08G 59/56
[52] U.S. Cl. ..................................... 525/504; 523/445;
523/448; 523/457; 523/458; 523/468; 528/88;
528/89; 528/90; 528/117; 528/361; 528/407
[58] Field of Search ................. 525/504; 523/445, 448,
523/457, 458, 468; 528/117, 361, 407, 88, 89, 90

[56] References Cited

U.S. PATENT DOCUMENTS

| | | | |
|---|---|---|---|
| Re. 28,669 | 12/1975 | Tomalia et al. | 528/117 |
| Re. 29,027 | 11/1976 | Alford et al. | 528/117 X |
| 3,476,712 | 11/1969 | Fukui et al. | 528/341 |
| 3,630,996 | 12/1971 | Tomalia | 528/117 |
| 3,639,395 | 2/1972 | Tomalia | 528/117 X |
| 3,716,520 | 2/1973 | Tomalia | 528/117 |
| 3,730,915 | 5/1973 | Tomalia et al. | 528/117 X |
| 3,784,508 | 1/1974 | Tomalia et al. | 528/117 |
| 4,652,620 | 3/1987 | Tufts | 528/117 X |

*Primary Examiner*—Earl Nielsen
*Attorney, Agent, or Firm*—Wenderoth, Lind & Ponack

[57] ABSTRACT

A cross-linked resin produced by heating a mixture of (a) a bis(2-oxazoline) compound, (b) an aromatic polyamine compound which has at least two amino groups in the molecule and (c) a polyepoxy compound which has at least two epoxy groups in the molecule at elevated temperatures, preferably in the presence of an oxazoline ring-opening polymerization catalyst. The resin shows a high mechanical strength and toughness, a very small water absorption and a very high resistance to heat.

20 Claims, No Drawings

CROSS-LINKED RESINS

This invention relates to cross-linked resins and a method for producing the same.

It is already known, as disclosed in U.S Pat. No. 3,476,712, that the reaction of a bis(2-oxazoline) compound with a dicarboxylic acid in an equimolar amount under heating produces linear polyesteramides.

It is further known that the reaction of bis(2-oxazoline) compound with a dicarboxylic acid in molar ratios of the bis(2-oxazoline) compound to the dicarboxylic acid of not less than about 1 in the presence of a catalyst such as organic phosphites to provide a cross-linked resin, as disclosed in U.S. Pat. No. 4,474,942.

On the other hand, it is also known that the reaction of a bis(2-oxazoline) compound with an epoxy compound and a polybasic carboxylic acid produces a cross-linked resin, as disclosed in Japanese Patent Laid-open No. 62-104837, and also that the reaction of a bis(2-oxazoline) compound with a polyfunctional amine produces a cross-linked resin, as disclosed in Japanese Patent Laid-open No. 62-104838.

Further, it is known that the reaction of a mono(2-oxazoline) compound with a monoamine compound in the presence of a metal catalyst produces an aminoethylamide, as described in U.S. Pat. No. 4,326,067 and J. Org. Chem. 49, 4889 (1984), whereas the reaction of a mono(2-oxazoline) compound with a diamine compound provides an imidazoline, as described in U.S. Pat. No. 4,014,880.

The present inventors have made an intensive investigation on the reaction of a bis(2-oxazoline) compound, and have found that the heating of a mixture of a bis(2-oxazoline) compound, an aromatic polyamine compound and a polyepoxy compound preferably in the presence of a catalyst readily provides a novel three-dimensionally cross-linked resin which is of high toughness but also of high heat-resistance and small water-absorption.

It is therefore an object of the invention to provide a novel cross-linked resin and a method for producing the same.

The cross-linked resin of the invention is produced by heating a mixture of (a) a bis(2-oxazoline) compound, (b) an aromatic polyamine compound which has at least two amino groups in the molecule and (c) a polyepoxy compound which has at least two epoxy groups in the molecule.

The method of producing cross-linked resins of the invention comprises: heating a mixture of (a) a bis(2-oxazoline) compound, (b) an aromatic polyamine compound which has at least two amino groups in the molecule and (c) a polyepoxy compound which has at least two epoxy groups in the molecule.

As hereinbefore described, the reaction of a bis(2-oxazoline) compound with an epoxy compound and a polybasic carboxylic acid produces a cross-linked resin. This reaction is composed of two reactions, i.e., a first reaction of a bis(2-oxazoline) compound with an epoxy compound and a second reaction of a bis(2-oxazoline) compound with a polybasic carboxylic acid, which concurrently proceed independently from each other. However, the reaction of the invention is a stepwise reaction. Namely, an aromatic polyamine compound and a polyepoxy compound react with each other, and then the resultant reaction product reacts at its amino group(s) with a bis(2-oxazoline) compound.

In general, when a resin has amide hydrogens, the resin has a relatively large water-absorption, and this is the case with resins produced by the reaction of a bis(2-oxazoline) compound with a polyamine compound. Therefore, the method of the invention effectively modifies the properties of a resin produced by the reaction of a bis(2-oxazoline) compound and a polyamine compound, and for example, the method of the invention is able to reduce water-absorption of the resin as mentioned above. Furthermore, since the reaction of the invention proceeds stepwise, designing of properties of resins is easily accomplished.

The bis(2-oxazoline) compound used in the present invention has the general formula:

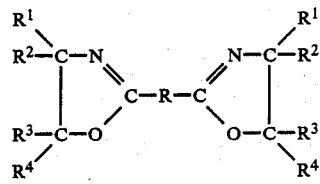

wherein R represents a C—C covalent bond or a divalent hydrocarbon group, preferably an alkylene, a cycloalkylene or an arylene, e.g., phenylene, and $R^1$, $R^2$, $R^3$ and $R^4$ independently represent hydrogen, an alkyl or an aryl. In the case where R is a C—C covalent bond, the bis(2-oxazoline) compound may be 2,2'-bis(2-oxazoline), 2,2'-bis(4-methyl-2-oxazoline) or 2,2'-bis(5-methyl-2-oxazoline). Examples of the bis(2-oxazoline) compound wherein R is a hydrocarbon group are 1,2-bis(2-oxazolinyl-2)ethane, 1,4-bis(2-oxazolinyl-2)butane, 1,6-bis(2-oxazolinyl-2)hexane, 1,8-bis(2-oxazolinyl-2)octane, 1,4-bis(2-oxazolinyl-2)-cyclohexane, 1,2-bis(2-oxazolinyl-2)benzene, 1,3-bis(2-oxazolinyl-2)benzene, 1,4-bis(2-oxazolinyl-2)benzene, 1,2-bis(5-methyl-2-oxazolinyl-2)benzene, 1,3-bis(5-methyl-2-oxazolinyl-2)benzene, 1,4-bis(5-methyl-2-oxazolinyl-2)-benzene and 1,4-bis(4,4'-dimethyl-2-oxazolinyl-2)benzene. These may be used as a mixture of two or more.

In the method of the invention, a mono(2-oxazoline) compound may be used together with the bis(2-oxazoline) compound. The mono(2-oxazoline) compound used includes, for example, 2-methyloxazoline, 2,4-dimethyloxazoline, 2-ethyloxazoline, 2,5-dimethyloxazoline, 4,5-dimethyloxazoline, 2-phenyloxazoline, 2-(m-tolyl)oxazoline, 2-(p-tolyl)-oxazoline and 5-methyl-2-phenyloxazoline.

The aromatic polyamine compound usable in the method of the invention is an aromatic amine which has at least two amino groups in the molecule, and may be a mononuclear or a polynuclear compound. Thus, the aromatic polyamine compound usable may be exemplified by, for example, o-, m- or p-phenylenediamine, 2,3-, 2,4- or 2,5-tolylenediamine, 4,4'-diaminobiphenyl, 3,3'-dimethoxy-4,4'-diaminobiphenyl, 4,4'-diaminotriphenylmethane, 3,3'-dimethyl-4,4'-diaminobiphenyl, 2,2',5,5'-tetrachloro-4,4'-diaminobiphenyl, 4,4'-methylenebisaniline, 4,4'-methylenebis(2-chloroaniline), 2,2'-bis[4-(4-aminophenoxy)phenyl]propane, 1,3-bis(4-amonophenoxy)benzene, 1,3-bis(3-aminophenoxy)benzene, 3,4'-diaminodiphenylether, 4,4'-diaminodiphenylsulfide or 4,4'-bis(aminophenyl)amine. Among these are in particular preferred 4,4'-methylenebisaniline, 4,4'-methylenebis(2-chloroaniline), 1,3-bis(3-aminophenoxy)benzene, 3,4'-diaminodiphenylether, 4,4'- diaminodiphenylsulfide or 2,2'-bis[4-(4-aminophenoxy)-phenyl]propane.

The aromatic polyamine compound is used in such amounts that the number of the oxazoline rings plus the number of the epoxy groups are not less than the number of the amino groups in the mixture of the bis(2-oxazoline) compound, aromatic polyamine compound and polyepoxy compound used.

Mono amine compounds which has a single amino group in the molecule may be used together with the aromatic polyamine compound. The preferred mono amine compound is an aromatic mono amine compound which may be either a mono- or polynuclear compound, and may be exemplified by aniline, methylaniline, ethylaniline, o-toluidine, m-toluidine, p-toluidine, α-naphthylamine or β-naphthylamine. However, aralkyl amines such as benzylamine may also be used as a mono amine compound.

The polyepoxy compound used in the invention is an epoxy compound which has at least two epoxy groups in the molecule, and includes, for example, bisphenol type epoxy resins such as bisphenol A-diglycidyl ether, bisphenol F-diglycidyl ether or tetrabromobisphenol A-diglycidyl ether; diglycidylester type epoxy resins such as diglycidyl phthalate, diglycidyl terephathalate, diglycidyl tetrahydrophthalate, diglycidyl hexahydrophthalate, diglycidyl p-hydroxybenzoate or dimer acid diglycidyl esters; novolac type epoxy resins or alicyclic type epoxy resins. The polyepoxy compound may be used singly or as a mixture.

The polyepoxy compound is used in amounts of not more than one mole per mole of the aromatic polyamine compound.

Monoepoxy compound which has a single epoxy group in the molecule may be used together with the polyepoxy compound in the invention. Such a monoepoxy compound may be exemplified by phenyl glycidyl ether or allyl glycidyl ether.

The reaction of the bis(2-oxazoline) compound with the aromatic polyamine compound and polyepoxy compound is carried out preferably in the presence of an oxazoline ring opening polymerization catalyst. The use of the catalyst decreases reaction temperatures or times.

The oxazoline ring-opening polymerization catalyst is already known, as described in, for example, Poymer J., Vol. 3, No. 1, pp. 35-39 (1972) and Polymerization Reaction Treatize Course 7, Ring-Opening Polymerization II, pp. 159-164, Kagaku Dojin (1973). In the reaction of the invention, a strong acid, a sulfonic acid ester, a sulfuric acid ester, a Lewis acid or an organic halide which contains at least one halomethyl group in the molecule is usable as the oxazoline ring-opening polymerization catalyst More specifically, the strong acid includes an oxoacid such as phosphorous acid, sulfuric acid or nitric acid; a hydroacid such as hydrochloric acid or hydrogen sulfide; and an organic strong acid such as phenyl phosphorous acid, alkanesulfonic acid, e.g., methanesulfonic acid or ethanesulfonicacid, arenesulfonic acid, e.g., benzenesulfonic acid, p-toluenesulfonic acid, dodecylbenzenesulfonic acid, naphthalene-α-sulfonic acid or naphthalene-β-sulfonic acid; sulfanilic acid or phenylphosphonic acid.

The sulfonic acid ester includes alkyl arenesulfonates, such as methyl p-toluenesulfonate or ethyl p-toluenesulfonate. The sulfuric acid ester includes dimethylsulfate and diethylsulfate.

The Lewis acid usable includes, for example, aluminum chloride, stannic chloride, vanadium chloride, vanadyl chloride, boron trifluoride, and the like.

Preferred examples of the organic halide as defined before are a monohalo- or polyhaloalkane, or a monohalo- or polyhaloalkene such as methyl iodide, butyl chloride, butyl bromide, butyl iodide, n-hexyl bromide, octyl chloride, octyl bromide, lauryl bromide, stearyl bromide, allyl bromide or ethane tetrabromide. Other examples of the organic halide are mono- or polyhalomethylbenzenes, e.g., benzyl bromide and p,p'-dichloromethylbenzene. The organic halide as the catalyst further includes a haloalkene which has a hydroxyl and/or a carboxyl group in the molecule, such as α-bromopropionic acid, 2,3-dibromopropanol or α-bromobutyric acid. Cyclohexyl halides such as cyclohexyl bromide or chloride are also usable as the catalyst.

The catalyst is used in amounts of 0.05-5% by weight, preferably 0.1-3% by weight based on the weight of resin materials, namely, a mixture of the bis(2-oxazoline) compound, aromatic polyamine compound and polyepoxy compound.

The reaction temperature depends on the individual resin materials as well as the catalyst used, and hence it is not specifically limited, however, usually it is not lower than about 80° C., preferably in the range of about 100° C. to 300° C., and most preferably in the range of about 100° C. to 200° C. The reaction time for the resin material to cure to form three-dimensionally cross-linked resins also varies depending on the individual resin materials and the catalyst used, but usually in the range of about 1 minute to 2 hours.

According to the invention, there is provided a cross-linked resin which has reinforcements and/or fillers combined therewith.

As the reinforcement, fibrous reinforcements which are used in the production of ordinary fiber reinforced resins are preferable. Specific examples of such fibrous reinforcements are inorganic fibers such as glass fibers, carbon fibers, quartz fibers, ceramic fibers, zirconia fibers, boron fibers, tungsten fibers, molybdenum fibers, steel fibers, berylium fibers and asbestos fibers; natural fibers such as cotton, flax, hemp, jute or sisal hemp; and synthetic fibers having heat-resistance at the reaction temperature such as polyamide fibers or polyester fibers. In order to improve the adhesion to the resin, the fibrous reinforcement may be treated in advance with, for example, boranes, silanes or aminosilanes. These fibrous reinforcements may be used singly or in combination of two or more.

Also the reinforcement may be used in various forms, for example, strands, mats, fabrics, tapes or short fibers of a uniform length. The combined use of the fibrous reinforcement of two or more of the forms may be adopted when desired.

The amount of the reinforcement may be selected, for example, upon the viscosity of the resin material, the reinforcement used, the requirements for cured products, etc., however, it is usually in the range of about 3-95% by weight, preferably about 5-80% by weight based on the resin materials.

Various fillers may also be incorporated into the cross-linked resin. Preferred examples of the filler include oxides such as silica, alumina or titanium dioxide; hydroxides such as aluminum hydroxide; carbonates such as calcium carbonate or magnesium carbonate; silicates such as talc, clay, glass beads or bentonite;

carbon materials such as carbon black; and metal powders such as iron powder or aluminum powder. The amount of the filler may be selected as in the case of the reinforcement, and it is usually in the range of about 3-95% by weight, preferably about 10-80% by weight based on the resin materials.

When carbon black, for example, is used to decrease surface resistance of resultant cured resins, it is used in amounts of about 0.1-1% by weight based on the resin materials.

In the production of the cross-linked resin of the invention, any additive known in the production of conventional cross-linked resins may be used, if necessary, such as stabilizers, pigments, fire retardants and the like.

A cross-linked resin which contains therein a fiber reinforcement and/or filler may be obtained by, admixing a resin material which preferably contains a catalyst and which is preferably a uniform melted material, with a fiber reinforcement and/or a filler, and then heating. When desired, a fiber reinforcement and/or filler may be impregnated with the melted resin material, and then heated.

For the production of the fiber reinforced cross-linked resin in particular, any known method is adoptable. By way of example, a melted resin material is injected into fibrous reinforcements disposed in a mold to impregnate the reinforcement with the melted resin material, and then is heated under a pressure, as in a preform matched metal die process or a resin injection process; a melted resin material is mixed and kneaded with fibrous reinforcements of a uniform length, and the resultant mixture is disposed or injected into a mold, followed by heating under a pressure, as in a bulk molding compound process, a transfer molding process, an injection molding or an RIM process; or fibrous reinforcements are impregnated with a melted resin material to form a prepreg, which is then heated under a pressure, as in an SMC process or a prepreg cloth process.

In molding a resin material combined with reinforcements and/or fillers, the molding temperature is usually about 130°-230° C., and the molding time is usually from about one minute to one hour, although it varies depending on the resin material and the catalyst used as well as the molding temperature.

The fiber-reinforced cross-linked resin thus obtained retains high mechanical strength and high heat-resistance of the cross-linked resin as a matrix resin, and therefore, it may be used in various fields as molded articles. For instance, such molded articles may be used in the fields of space craft, air craft, craft, railway vehicles, automobiles, civil engineering, construction and building, electrical and electronic appliances, anti-corrosion equipment, sporting and leisure goods, medical and industrial parts, but also in the new applications where conventional fiber-reinforced plastics have failed to achieve application development on account of insufficient strength or heat-resistance, or large water-absorption.

As above set forth, the reaction of the bis(2-oxazoline) compound with the aromatic polyamine compound and polyepoxy compound preferably in the presence of a catalyst as described hereinbefore at elevated temperatures readily provides in a short period of time cross-linked resins which are infusible and undissolvable, and very hard. Further, the resin is of a high mechanical strength and toughness, a very small water absorption, and a high resistance to heat.

The present invention will be more easily understood with reference to the following examples, which however are intended to illustrate the invention only and are not to be construed as limiting the scope of the invention. In the examples, moles of epoxy resins were given by twice the epoxy equivalents; the thermal deflection temperature was measured under a load of 18.6 kg applied to a sample resin sheet of 3 mm in thickness, and the water absorption was measured by the increase in weight of a sample in the form of disc after immersing in water at 23° C. for 24 hours.

EXAMPLE 1

A mixture of 25.9 g (0.12 mole) of 1,3-bis(2-oxazolinyl-2)benzene, 13.9 g (0.07 mole) of 4,4'-methylenebisaniline, 11.9 g (0.03 mole) of "Epikote 815" (Yuka-Shell Epoxy K.K.) and 0.25 g of methyl p-toluenesulfonate was heated on an oil bath at about 140° C. with stirring.

After three minures from the outset of heating, the mixture became transparent and liquid at about 110° C., and after four minutes the mixture gelled at about 133° C. Immediately after the cure, the product was dark brown.

EXAMPLE 2

A mixture of 13.0 g (0.06 mole) of 1,3-bis(2-oxazolinyl-2)benzene, 5.0 g (0.025 mole) of 4,4'-methylenebisaniline, 9.3 g (0.024 mole) of "Epikote 815" and 0.14 g of p-toluenesulfonic acid was heated on an oil bath at about 140° C. with stirring.

After three minures from the outset of heating, the mixture became transparent and liquid at about 110° C., and after eight minutes the mixture gelled at about 200° C.

EXAMPLE 3

A mixture of 13.0 g (0.06 mole) of 1,3-bis(2-oxazolinyl-2)benzene, 5.9 g (0.03 mole) of 4,4'-methylenebisaniline, 7.6 g (to 0.02 mole) of "Epikote 828" (Yuka-Shell Epoxy K.K.) and 0.13 g of octyl bromide was heated on an oil bath at about 160° C. with stirring.

After 26 minures from the outset of heating, the mixture reached a temperature of 153° C. when the increase of viscosity was found, but no gelation took place. Then 0.13 g of octyl bromide was further added to the mixture, and heated, and after about 30 minutes, the mixture gelled at about 155° C.

EXAMPLE 4

A mixture of 51.8 g (0.24 mole) of 1,3-bis(2-oxazolinyl-2)benzene, 23.8 g (0.12 mole) of 4,4'-methylenebisaniline, 30.2 g (0.08 mole) of "Epikote 828" and 0.53 g of methyl p-toluenesulfonate was heated on an oil bath at about 140° C. with stirring. When the mixture reached a temperature of 115° C., it became a transparent liquid.

The liquid mixture was then poured into a mold which had a cavity of 3 mm in width which had been in advance heated to 160° C., and then was left standing in an oven at 160° C. for 10 minutes, and then the mold was heated to 200° C., to allow the mixture to cure for 50 minutes.

The cured sheet of 3 mm in thickness thus obtained was transparent and green, and infusible and undissolvable in organic solvents. The properties of the resin are as follows:

| Thermal deflection temperature | 220° C. |
|---|---|
| Hardness by a Barcol impressor | 54 |
| Flexural strength | 18 kgf/mm$^2$ |
| Flexural modulas | 420 kgf/mm$^2$ |
| Deflection | 6.1% |
| Water absorption | 0.23% |

EXAMPLE 5

A mixture of 38.9 g (0.18 mole) of 1,3-bis(2-oxazolinyl-2)benzene, 30.8 g (0.075 mole) of 2,2'-bis[4-(4-aminophenoxy)phenyl]propane, 28.5 g (0.075 mole) of "Epikote 828" and 0.75 g of n-butyl p-toluenesulfonate was heated on an oil bath at about 140° C. with stirring. When the mixture reached a temperature of 108° C., it became a transparent liquid.

The liquid mixture was then poured into the same mold as in Example 4 which had been in advance heated to 200° C., and then was left standing in an oven at 200° C. for one hour.

The cured sheet of 3 mm in thickness thus obtained was transparent and amber-colored, and infusible and undissolvable in organic solvents. The properties of the resin are as follows:

| Thermal deflection temperature | 200° C. |
|---|---|
| Hardness by a Barcol impressor | 52 |
| Flexural strength | 17 kgf/mm$^2$ |
| Flexural modulas | 410 kgf/mm$^2$ |
| Deflection | 5.5% |
| Water-absorption | 0.26% |

EXAMPLE 6

A mixture of 29.7 g (0.137 mole) of 1,3-bis(2-oxazolinyl-2)benzene, 36.4 g (0.183 mole) of 4,4'-methylenebisaniline, 33.9 g (0.0917 mole) of "Epikote 815" and 0.55 g of octyl bromide was heated on an oil bath at about 130° C. with stirring to form a melt.

The melted mixture was then poured into the same mold as in Example 4 which had been in advance heated to 170° C., and then was left standing in an oven at 170° C. for 30 minutes.

The cured sheet of 3 mm in thickness thus obtained was infusible and undissolvable in organic solvents. The properties of the resin are as follows:

| Thermal deflection temperature | 116° C. |
|---|---|
| Hardness by a Barcol impressor | 31 |
| Flexural strength | 22 kgf/mm$^2$ |
| Flexural modulas | 400 kgf/mm$^2$ |
| Deflection | 7.8% |
| Water absorption | 0.16% |

What is claimed is:

1. A cross-linked resin produced by heating a mixture of (a) a bis(2-oxazoline) compound, (b) an aromatic polyamine compound which has at least two amino groups in the molecule and (c) a polyepoxy compound which has at least two epoxy groups in the molecule at an elevated temperature of not lower than 80° C.

2. The cross-linked resin as claimed in claim 1 wherein the heating of the mixture is carried out in the presence of an oxazoline ring-opening polymerization catalyst.

3. The cross-linked resin as claimed in claim 1 wherein the oxazoline ring-opening polymerization catalyst is a strong acid, a sulfonic acid ester, a sulfuric acid ester, a Lewis acid or an organic halide which has at least one halomethyl group in the molecule.

4. The cross-linked resin as claimed in claim 1 wherein the strong acid is an arenesulfonic acid.

5. The cross-linked resin as claimed in claim 1 wherein the sulfonic acid ester is an alkyl arenesulfonate.

6. The cross-linked resin as claimed in claim 1 wherein the organic halide is a monohaloalkane.

7. The cross-linked resin as claimed in claim 1 wherein the catalyst is used in amounts of 0.05-5% by weight based on the weight of the mixture.

8. The cross-linked resin as claimed in claim 2 wherein the mixture is heated in the presence of about 3-95% by weight of reinforcements based on the mixture.

9. The cross-linked resin as claimed in claim 2 wherein the mixture is heated in the presence of about 3-95% by weight of fillers based on the mixture.

10. The cross-linked resin as claimed in claim 1 wherein the aromatic polyamine compound is contained in the mixture in such amounts that the number of the oxazoline rings plus the number of the epoxy groups are not less than the number of the amino groups in the mixture, and the polyepoxy compound is contained in the mixture in amounts of not more than one mole per mole of the aromatic polyamine compound used.

11. A method of producing a cross-linked resin which comprises: heating a mixture of (a) a bis(2-oxazoline) compound, (b) an aromatic polyamine compound which has at least two amine groups in the molecule and (c) a polyepoxy compound which has at least two epoxy groups in the molecule at an elevated temperature of not lower than 80° C.

12. The method as claimed in claim 11 wherein the heating of the mixture is carried out in the presence of an oxazoline ring-opening polymerization catalyst.

13. The method as claimed in claim 11 wherein the oxazoline ring-opening polymerization catalyst is a strong acid, a sulfonic acid ester, a sulfuric acid ester, a Lewis acid or an organic halide which has at least one halomethyl group in the molecule.

14. The method as claimed in claim 11 wherein the strong acid is an arenesulfonic acid.

15. The method as claimed in claim 11 wherein the sulfonic acid ester is an alkyl arenesulfonate.

16. The method as claimed in claim 11 wherein the organic halide is a monohaloalkane.

17. The method as claimed in claim 11 wherein the catalyst is used in amounts of 0.05-5% by weight based on the weight of the mixture.

18. The method as claimed in claim 12 wherein the mixture is heated in the presence of about 3-95% by weight of reinforcements based on the mixture.

19. The method as claimed in claim 12 wherein the mixture is heated in the presence of about 3-95% by weight of fillers based on the mixture.

20. The method as claimed in claim 11 wherein the aromatic polyamine compound is contained in the mixture in such amounts that the number of the oxazoline rings plus the number of the epoxy groups are not less than the number of the amino groups in the mixture, and the polyepoxy compound is contained in the mixture in amounts of not more than one mole per mole of the aromatic polyamine compound used.

* * * * *